United States Patent
Manners et al.

(10) Patent No.: US 6,649,113 B1
(45) Date of Patent: Nov. 18, 2003

(54) METHOD TO REDUCE DIFFERENTIAL SHRINKAGE IN THREE-DIMENSIONAL STEREOLITHOGRAPHIC OBJECTS

(76) Inventors: Chris R. Manners, 4337 Riverglen St., Moorpark, CA (US) 93021; Kabir Bhatia, 25399 the Old Road #6-306, Stevenson Ranch, CA (US) 91381; Hop D. Nguyen, 42326 59th St. W., Quartz Hill, CA (US) 93536; Cathy Yenly Vu Phan, 11122 Sherman Ave., Garden Grove, CA (US) 92843; Khalil M. Moussa, 25733 Barnett La., Stevenson Ranch, CA (US) 91381

( * ) Notice: Subject to any disclaimer, the term of this patent is extended or adjusted under 35 U.S.C. 154(b) by 355 days.

(21) Appl. No.: 09/637,829

(22) Filed: Aug. 11, 2000

(51) Int. Cl.$^7$ .......................... B29C 35/08; B29C 41/02
(52) U.S. Cl. ........................................ 264/401; 264/308
(58) Field of Search ................... 264/308, 401

(56) References Cited

U.S. PATENT DOCUMENTS

| | | |
|---|---|---|
| 2,775,758 A | 12/1956 | Munz |
| 4,575,330 A | 3/1986 | Hull |
| 4,863,538 A | 9/1989 | Deckard |
| 4,929,402 A | 5/1990 | Hull |
| 4,945,032 A | 7/1990 | Murphy et al. |
| 4,961,154 A | 10/1990 | Pomerantz et al. |
| 5,104,592 A | 4/1992 | Hull et al. |
| 5,182,055 A | 1/1993 | Allison et al. |
| 5,182,056 A * | 1/1993 | Spence et al. ............... 264/401 |
| 5,198,159 A * | 3/1993 | Nakamura et al. .......... 264/401 |
| 5,209,878 A | 5/1993 | Smalley et al. |
| 5,238,639 A | 8/1993 | Vinson et al. |
| 5,597,520 A | 1/1997 | Smalley et al. |
| 5,902,538 A | 5/1999 | Kruger et al. |
| 6,103,176 A | 8/2000 | Nguyen et al. |

FOREIGN PATENT DOCUMENTS

| | | |
|---|---|---|
| EP | 0 322 257 A2 | 6/1989 |
| EP | 0 388 129 A2 | 9/1990 |
| JP | 61-225012 A | 10/1986 |
| JP | 63-145015 A | 6/1988 |
| JP | 2-95830 A | 4/1990 |
| JP | 2-95831 A | 4/1990 |

* cited by examiner

*Primary Examiner*—Leo B. Tentoni
(74) *Attorney, Agent, or Firm*—Ralph D'Alessandro

(57) ABSTRACT

A method of forming a three-dimensional object in layer-wise fashion by selectively solidifying a build material in a reinforced cyclical fashion. The method solidifies a first fully cured layer of build material and then partially solidifies at least one partially cured intermediate layer of build material having areas of liquid build material and areas of solidifying build material. The method repeats the cycle by solidifying a next overlying fully cured layer of build material and also the underlying liquid areas of build material in the at least one partially cured intermediate layer of build material.

16 Claims, 2 Drawing Sheets

METHOD TO REDUCE DIFFERENTIAL SHRINKAGE IN THREE-DIMENSIONAL STEREOLITHOGRAPHIC OBJECTS

FIELD OF INVENTION

This invention relates generally to improvements in methods for forming three-dimensional objects from a fluid medium. More particularly, the invention relates to a new and improved stereolithography method involving the application of enhanced data manipulation and stereolithographic curing techniques to produce three-dimensional objects that are formed more accurately and economically from photocurable polymers.

BACKGROUND OF THE INVENTION

Stereolithography represents an expeditious way to quickly make complex or simple parts without tooling. Since this technology depends on using a computer to generate its cross-sectional patterns, there is a natural data link to CAD/CAM. However, such systems have encountered difficulties relating to shrinkage, curl and other distortions, as well as resolution, accuracy and difficulties in producing certain object shapes.

Objects built using stereolithography have a tendency to distort from their CAD designed dimensions. This distortion may or may not appear in a specific object, based on how much stress is developed by the specific cure parameters and on the ability of the object to withstand stress. The stress that causes distortion develops when material that is being converted from liquid to solid comes into contact with and bonds to previously cured material. When material is converted from liquid to solid, it shrinks slightly. All stereolithography reins undergo shrinkage when cured. The shrinkage will vary with the type of resin, rate of exposure, and other related factors. This shrinking causes stress and has two primary physical causes: (1) density of the liquid is less than that of the solid plastic; and (2) the chemical reaction that causes the change of state is strongly exothermic, causing the curing material to thermally expand and contract.

Certain sections of an object will be able to resist stresses without any apparent warp, that is where stress is at a tolerable level. On the other hand, other sections may distort considerably as the stress and structural strength balance each other. Since stress is caused by contact between curing material and cured material, it can be propagated along the entire length of contact between the curing line and cured material. Most contact of curing to cured material occurs from one layer to the next as opposed to along a single layer. This implies most distortions will be vertical in nature as opposed to horizontal. Further, large features in the XY plane tend to shrink more than smaller features in the XY plane. Since shrinkage is a fixed volumetric percentage, when a part transitions from a large feature to a small feature along the Z direction, the difference in shrinkage values produces a pronounced discontinuity on the external surface that is a geometric imperfection more commonly known as the differential shrinkage effect. Differential shrinkage is greatest in parts transitioning from a large feature to a small or thin feature, for example, from a large base to a thin wall. Therefore, there is a need for a technique to reduce vertical distortions.

SUMMARY OF THE INVENTION

It is an aspect of the present invention that a method of producing stereolithographic parts is disclosed that uses a curing technique which reduces or controls differential shrinkage to an acceptable level in the building of parts.

It is another aspect of the present invention that shrinkage during the building of stereolithographic parts is controlled in the Z direction.

It is a feature of the present invention that a build style is used that combines a cyclic build style with a small spot size curing weave on layers of build material not being cyclically hatched or cured.

It is another feature of the present invention that the small spot size curing reduces the amount of material cured at one time, thereby reducing the rate of shrinkage in the part.

It is yet another feature of the present invention that the curing technique provides a grid formed from the small spot size curing that acts as a simulated fiber in the fiber-reinforced plastic to prevent or reduce further material shrinkage.

It is yet another feature of the present invention that the solidifying layers of build material in any intermediate partially cured layers are not adhered to the underlying layer after a curing done in a first scanning direction and are adhered to the underlying layer after a curing done in a second scanning direction.

It is still another feature of the present invention that use of the small spot size laser curing permits the cure to be deeper and slightly slower without appreciably affecting the speed of part formation.

It is an advantage of the present invention that the stereolithographic method of curing a photopolymer material reduces distortion in transition areas going from large features to small features.

It is another advantage of the present invention that the speed of the build of a stereolithographic part is not sacrificed to an unacceptable level to achieve reduced differential shrinkage in the part.

These and other aspects, features and advantages are achieved in the stereolithographic method of the present invention by curing multiple layers of build material in a cyclical fashion by solidifying a first fully cured layer of build material, partially solidifying at least one partially cured intermediate layer of build material, and then solidifying a second fully cured layer of build material and the liquid areas of unsolidified build material in the at least one intermediate partially cured layer.

BRIEF DESCRIPTION OF THE DRAWING

These and other aspects, features, and advantages of the invention will become apparent upon consideration of the following detailed disclosure of the invention, especially when it is taken in conjunction with the accompanying drawings wherein:

FIGS. 3A–3C diagrammatically illustrate the reinforced cyclical pattern employed to solidify overlying layers of build material, wherein FIG. 3A shows a fully cured base layer, FIG. 3B shows a fully cured base layer with an overlying intermediate layer having partially cured areas and liquid areas, and FIG. 3C shows three layers of build material with two fully cured layers sandwiching a partially cured intermediate layer that is fully cured by the exposure of the overlying fully cured layer.

DETAILED DESCRIPTION OF THE PREFERRED EMBODIMENT

Figure 1:
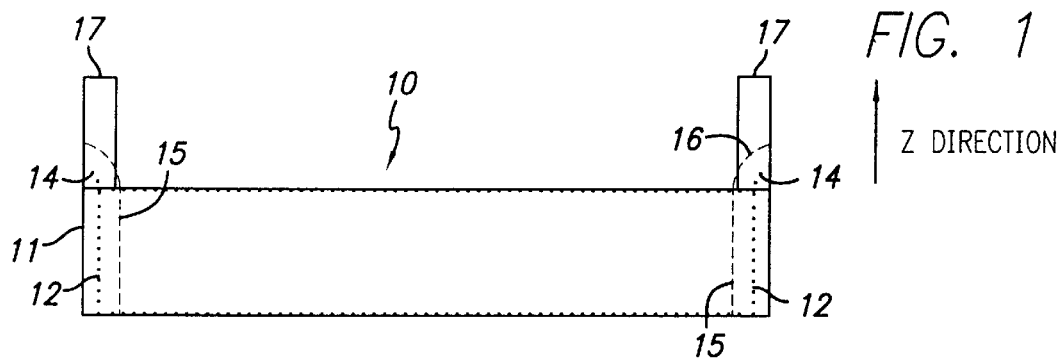
FIG. 1 is a diagrammatic illustration of a portion of a three-dimensional part built using the claimed invention and illustrating the effect of unmitigated and mitigated differential shrinkage in the transition between a large feature and a fine feature area.

FIG. 1 discloses a diagrammatically illustration of an end view of a three-dimensional part or object built using a stereolithographic method and having large features and fine features that are subjected to differential shrink distortion. The differential shrinkage occurs from the solidifying of the liquid build material to a solid form and is illustrated in FIG. 1. The base, indicated generally by the numeral 10, is a fully cured and solidified base of the part. The CAD image part lines for the outer surfaces of the cross-sectional view are indicated by the numeral 11. This is the dimension of the part as it is drawn and desired. Border lines 12 indicate the post-cure mitigated or reduced shrinkage boundary for the large feature base portion of the part, while the dotted lines indicated by the numeral 14 indicate the same shrinkage boundary for the fine feature transition for the part. The unmitigated differential shrinkage of the large feature area, or the boundary of the base portion of the part, is shown by lines 15, and the unmitigated differential shrinkage boundary for the fine feature transition area is indicated by the dotted lines and by the numeral 16. FIG. 1 then represents a three-dimensional object that has fine wall vertical extensions 17 extending vertically up from a fully solidified base 10.

Figure 2:
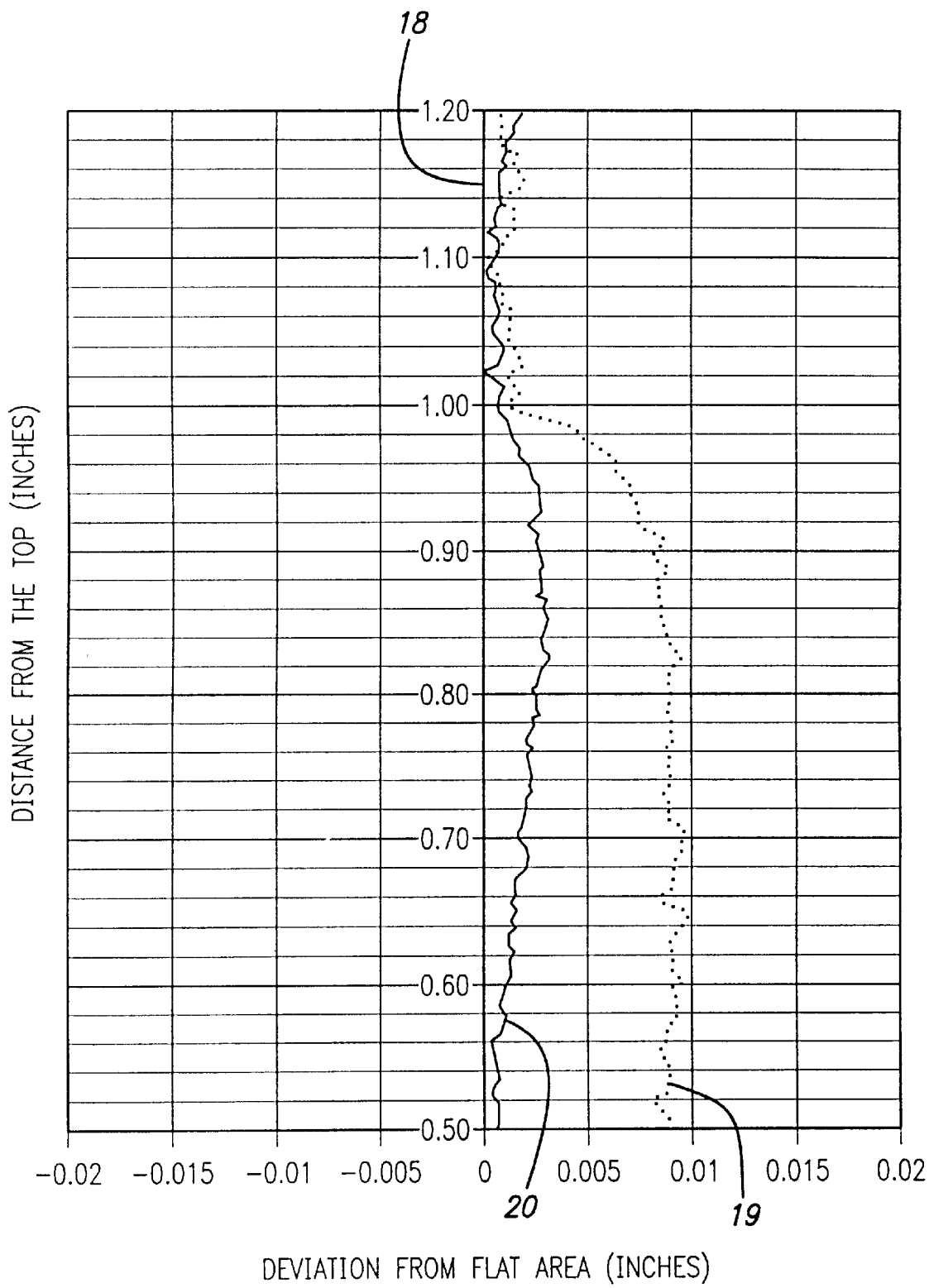
FIG. 2 is a graphical illustration in a vertical wall profile of the object depicted in FIG. 1 of the differential shrinkage comparing mitigated and unmitigated shrinkage from the ideal CAD image part line.

FIG. 2 indicates a graphical illustration of a left vertical wall line in the part diagrammatically illustrated in FIG. 1 where 18 is the CAD image vertical wall line, 19 indicates the deviation in an unmitigated differential shrink line for a large feature boundary and 20 indicates the mitigated differential shrink line in the vertical wall for the same feature boundary. As can been seen from FIG. 2, there is substantial improvement in the differential shrinkage compensation method described hereinafter between the unmitigated and the mitigated vertical wall boundaries.

Figure 3A:
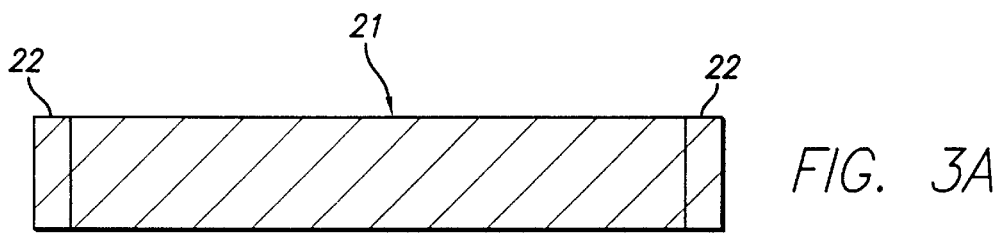
Figure 3B:
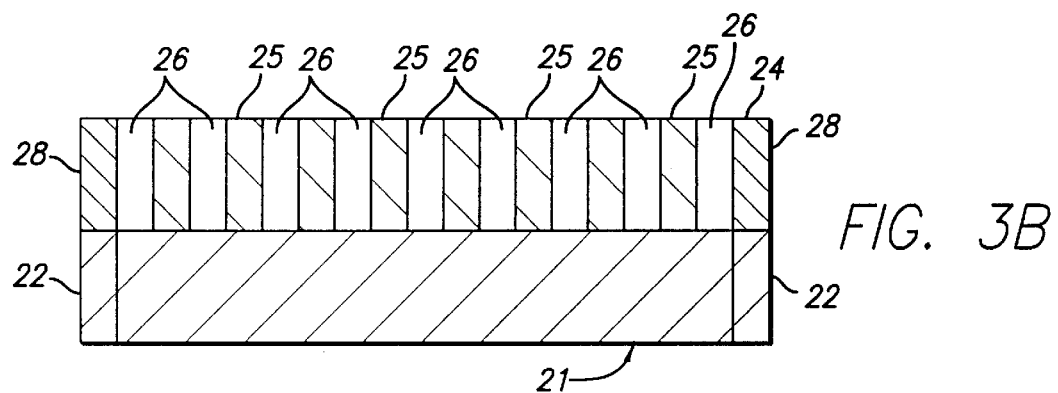
Figure 3C:
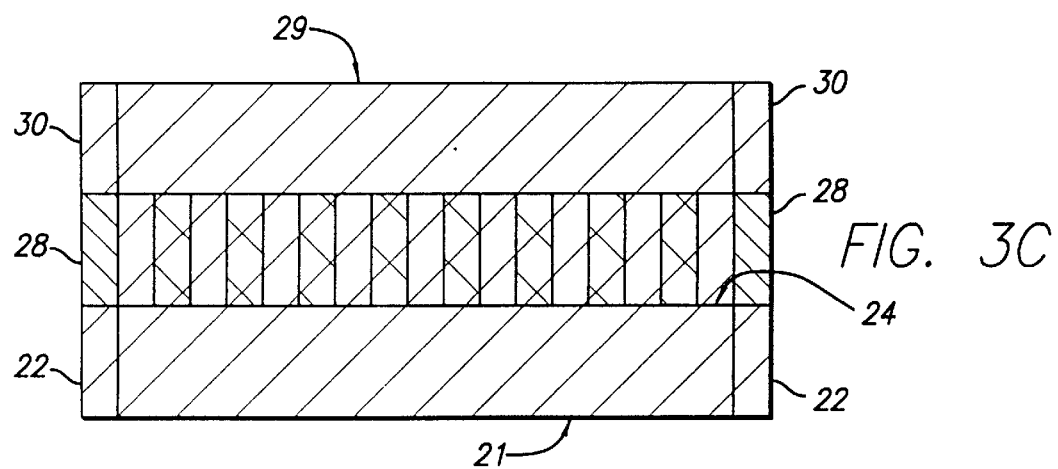

The method of differential shrinkage compensation employed in the curing of the large-featured part with transition to fine-featured part described by this present invention is shown in FIGS. 3A-3C. FIG. 3A shows the first layer of a part that has a fully cured base 21 with base layer borders 22 that have been separately cured. Base boundary layers 22 may be cured either with a small spot size laser beam width of about 0.1 mil. Alternatively, a large spot size beam width laser with a laser beam width of about 0.3 mils. may be used to cure an interior border boundary (not shown) in the base layer 21 and in successive layers or laminae. FIG. 3B then indicates the recoating of a layer of build material on top of base layer 21 and the partial curing of the intermediate partially cured layer 24. Again, boundary borders in the partially cured layer are indicated by the numeral 28 and partially cured or solidifying areas are indicated by the numeral 25. Liquid or unsolidified areas are indicated by the numeral 26. The partially solidifying areas 26 in the partially cured intermediate layer 24 indicates that the layer of build material has been selectively exposed by a laser beam to create solidifying areas that are gel-like or solid while the areas 26 have not been exposed and are unsolidified or liquid areas.

FIG. 3C then indicates the completion of a cyclical curing pattern wherein another layer of build material is laid atop the partially cured intermediate layer 24 and exposed by a laser beam with an exposure depth sufficient to fully cure the layer 29 and the underlying liquid areas 25 in the partially cured intermediate layer 24. Again, boundary borders 30 can be cured by a small spot laser in the second fully cured layer.

It should be noted that multiple partially cured intermediate layers may be employed to create the reinforced cyclic curing pattern of the present invention. As disclosed, there are three layers in the cure pattern where there is a fully cured base layer, a single intermediate partially cured layer, and a fully cured overlying layer. Alternatively, two, three, four or more partially cured intermediate layers could be employed between the fully cured layers, and the curing cycle may be repeated until the three-dimensional part is built. Normal cure vectors are employed in the curing process in addition to the boundary vectors. These can include fill vectors and hatch vectors. Hatch vector curing may be employed in the partially cured intermediate layers to cure the build material. The principle employed in utilizing the appropriate cure vector is the reduction of the amount of build material to be cured at one time in each intermediate layer or lamina to reduce differential shrinkage. The build material preferably is a photocurable photopolymer resin such as that commercially available from 3D Systems, Inc. in Valencia, Calif., as SL 7540, SL 7520 or SL 7510.

The essence of the present invention lies in the fact that the present build style or method of curing minimizes or reduces the amount of resin that will shrink upon solidification by employing an intermediate solidification step for intermediate lamina or layers. More detailed discussions of the ability to perform this type of curing are described in U.S. Pat. Nos. 6,103,176 and 5,902,538, both assigned to the assignee of the present invention.

It should also be noted that the present invention can be employed with dual spot size laser beam widths or single small spot size laser beam widths. If only a small spot size beam width is employed, the cure is slower to permit chemical reaction from the photopolymerization to occur and still obtain reduced shrinkage. The preferred source of UV light for curing is a laser with a defined beam width or diameter. Suitable lasers include an HeCd laser or preferably a solid state laser. Small spot size exposure can be employed to reduce shrinkage, as discussed previously, and in conjunction with reduced laser power. For example, use of a maximum laser power of 300 mW has proven to significantly reduce differential shrinkage. Use of a small spot size laser beam preferably employs a laser beam width of 12 mil or less and when used in a dual spot size mode of operation employs a large spot size laser beam width of 27 mil. When use of a single spot size laser beam is employed the beam width can be any size greater than 12 mil.

It should also be noted that a key component of the present invention is that in the curing of the partially cured intermediate layer, the laser beam scans in a first direction and subsequently a second direction in the XY plane. During the scan in the first scanning direction of the XY plane, the partially cured intermediate layer is not adhered to the underlying layer. During the scan in the second scanning direction, the partially cured intermediate layer is adhered to the underlying layer. The first scanning direction may be performed in either the X direction or the Y direction of the XY plane. The second scanning direction may be in any direction that is not parallel to the first scanning direction.

The present method of forming a three-dimensional object obtains solidification of the liquid material in various volumetric percentages in the intermediate layers. The partially cured intermediate layer can be solidified from about 20% to about 80% by volume of the build material, more preferably from about 50% to about 75% by volume of the build material, and most preferably by about 60% to about 75% by volume of the build material during the curing of the partially intermediate layer.

While the present invention has been primarily developed to reduce shrinkage in the transition region of stereolithographic parts between large-featured areas such as bases and fine-featured areas such as thin walls, it should be noted that the technique can be applied equally well to other technologies forming three-dimensional objects. It could be equally well applied to systems employing photopolymers with any UV curable system. The reduction in the volume of resin that must be cured at one time in the partially cured intermediate layers is the key to reducing the amount of shrinkage. Additionally, the solidified areas in the intermediate partially cured layers provides a reinforcing fiber effect to the build object and prevents the material from shrinking.

Additionally, while described in the context of liquid photopolymers employed in stereolithographic apparatus, it is possible to employ the invention with other material in other applications. For example, a paste or sinterable material that is curable with UV light may also be appropriately employed. The paste can be a metallic or ceramic material blended with curable liquid.

Accordingly, the spirit and broad scope of the appended claims is intended to embrace all such changes, modifications, and variations that may occur to one of skill in the art upon the reading of the disclosure. All patent applications, patents and other publications cited herein are incorporated by reference in their entirety.

Having thus described the invention, what is claimed is:

1. A method of forming a three-dimensional object part in layerwise fashion by selectively solidifying a build material comprising:
   (a) solidifying a first fully cured layer of build material;
   (b) partially solidifying at least one partially cured intermediate layer of build material overlying at least a portion of the first fully cured layer by having liquid areas of build material and solidifying areas of build material, the solidifying areas not being adhered to the first fully cured layer after a curing done in a first scanning direction and being adhered to the first fully cured layer after a second curing done in a second scanning direction; and
   (c) solidifying a second fully cured layer of build material and the liquid areas of the build material in the at least one partially cured intermediate layer to thereby create a solid three-dimensional object with controlled shrinkage, the second fully cured layer overlying at least a portion of the at least one partially cured intermediate layer.

2. The method according to claim 1 wherein the curing done in the first scanning direction is in either the X direction or the Y direction of the XY plane.

3. The method according to claim 2 wherein the curing done in the second scanning direction is not parallel to the first scanning direction.

4. The method according to claim 1 wherein the solidifying the at least one partially cured intermediate layer of build material solidifies about 20% to about 80% by volume of the build material.

5. The method according to claim 1 wherein the solidifying the at least one partially cured intermediate layer of build material solidifies about 50% to about 75% by volume of the build material.

6. The method according to claim 1 wherein the solidifying the at least one partially cured intermediate layer of build material solidifies about 60% to about 75% by volume of the build material.

7. The method according to claim 1 further comprising using a photopolymer as the build material.

8. The method according to claim 7 further comprising using UV light to do the curing of the photopolymer.

9. The method according to claim 7 further comprising using a laser beam to do the curing of the photopolymer having at least one spot size single beam width.

10. The method according to claim 9 further comprising using a laser beam to do the curing of the photopolymer having a small spot size beam width of about 0.012 inch diameter or less.

11. The method according to claim 9 further comprising using a laser beam to do the curing of the photopolymer having a large spot size beam width of about 0.03 inch diameter or more.

12. The method according to claim 9 further comprising using a laser beam to do the curing of the photopolymer selectively having a large spot size beam of about 0.027 inch diameter or more and a small spot size beam of about 0.012 inch diameter or less.

13. The method according to claim 12 further comprising using a large spot size beam to cure borders for hatch and/or fill and for hatch and/or fill interiorly of the borders for the first layer of build material.

14. The method according to claim 13 further comprising using a small spot size beam for the at least one partially cured intermediate layer of build material to cure borders for hatch and/or fill and hatch and/or fill interiorly of the borders to create reinforcing areas of solidified build material to help reduce shrinkage upon subsequent solidification of the build material when curing an overlying layer of build material to the third layer.

15. The method according to claim 1 further comprising partially solidifying a plurality of partially cured intermediate layers of building material overlying at least a portion of the first fully cured layer.

16. The method according to claim 1 further comprising partially solidifying at least a second partially cured intermediate layer of build material overlying at least a portion of the at least one partially cured intermediate layer of build material by having liquid areas of build material and solidifying areas of build material, the solidifying areas not being adhered to the at least one partially cured intermediate layer after a curing done in a first scanning direction and being adhered to the at least one partially cured intermediate layer after a curing done in the second scanning direction.

* * * * *